Nov. 14, 1961 E. N. FRANK 3,008,463
COMBINED BARBECUE GRILL AND HAND TRUCK
Filed July 15, 1959

INVENTOR.
ELMER N. FRANK,
BY
ATTORNEY.

United States Patent Office 3,008,463
Patented Nov. 14, 1961

3,008,463
COMBINED BARBECUE GRILL AND HAND TRUCK
Elmer N. Frank, 2437 S. Howell Ave., Milwaukee, Wis.
Filed July 15, 1959, Ser. No. 827,285
9 Claims. (Cl. 126—9)

This invention relates to a combination portable barbecue grill and hand truck, the device being easily and swiftly convertible from one to the other as occasion demands. As an accessory of spare time, out-of-door living today, the barbecue grill has come into very widespread use and has assumed many different shapes and forms designed for portability and ease of handling. It is a principal object of this invention to provide a convertible unit of this kind which is light in weight, compact and sturdy in use either as a grill or as a hand truck, and collapsible into a very small space for storage purposes. It is designed for economy of manufacture and ease of handling, including an absolute minimum of parts which will give it a wide market appeal because of its low cost.

The invention is designed so that it can be collapsed into a substantially flat condition to be readily stored in the trunk or luggage rack of a car, or elsewhere, and yet almost instantaneously and effortlessly be set up for use as a grill. It may be used as a hand truck for transporting articles from the car or elsewhere to the selected site, and may be used as well for a shopping cart for transporting purchases from the store to the home, without any inconvenience whatsoever caused by the parts used for a grill or pan when the device is used as a barbecue. These parts, in fact, perform important functions when used as a hand truck.

Further objects of the invention are to provide a device of the kind described in which many of the parts thereof serve a double function: in which the legs of the device when used as a barbecue grill function as side rails when used as a truck, and in which the firepot and table and grill portions of the barbecue unit function as a platform for said truck.

Other objects and functions will become apparent from the accompanying drawing and specification illustrating and describing one practical embodiment of the invention, and in which.

Figure 1:
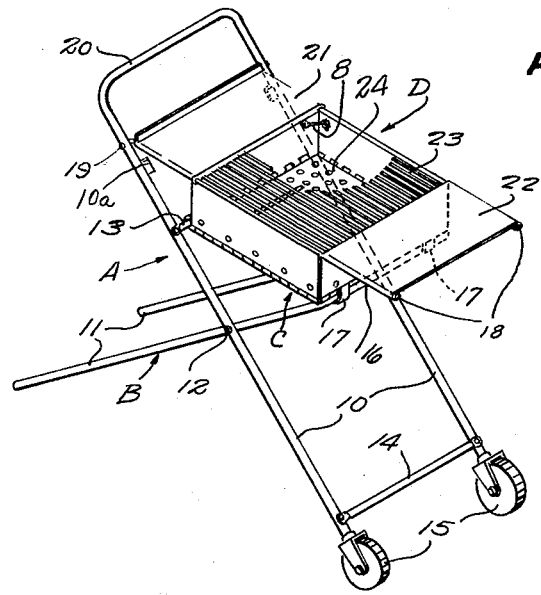
FIGURE 1 is a perspective view of the combination erected as a barbecue grill.

The combination embodies a pair of light tubular frames A and B, generally of integral U-shape, each having a pair of legs 10 and 11, respectively, connected by a handle member and pivoted together substantially midway of their lengths at 12, the frame A being of somewhat greater length than the frame B. The frame A has its legs 10 connected by a cross brace 13 at a point substantially above the pivot 12, and the lower free ends of the legs are similarly joined by a cross brace 14. The free end of each leg 10 carries a caster 15.

That portion 16 of the frame B which connects the legs 11 forms a support for a firepot or pan C which has a bottom, side and end walls perforated as shown. This pan is hinged to the brace 16 by a pair of spaced hinges 17 in such a manner as to permit it to swing freely with respect to said legs 11. The pan carries a pair of hooks 9 at one end for a purpose which will be described. The firepot walls are collapsible with respect to the bottom thereof, being hinged thereto, and are supported in their erected position on said bottom by means of pairs of cooperating hooks and eyes 8 secured to said walls in diagonally opposite corners of said pot, as shown in FIGURES 1 and 2.

A table and grill combination D comprises a pair of arms 18, each pivoted to the frame A at 19, at a point between the brace 13 and the handle portion 20 of the frame.

A pair of table surfaces 21, 22 are suitably connected to these arms, one table at each end, and a grill 23 is connected across these arms intermediate said table members.

Figure 2:
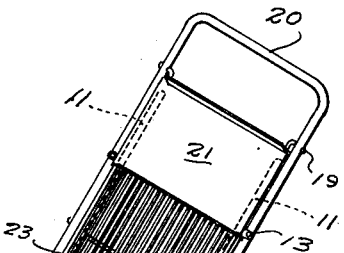
FIGURE 2 is a similar view of the combination set up as a hand truck.

When erected for use as a grill, as shown in FIGURE 1, it will be observed that the frames A and B assume a cross-legged position, pivoting around the point 12, with the lower ends of the legs of each frame forming supports. The pan C is swung into a position so that the hooks 9 at one end thereof engage over the crossbar 13, thereby locking the entire device into a stable condition. The table D is swung about its pivots 19 so that it rests on the pan C, with the grill 23 directly over the pan and the shelves 21, 22 disposed on each side thereof. In this position, the table D and the bottom of the pan C are substantially parallel to one another. The pan C may be filled with coals and ignited, the perforations in the pan providing the draft necessary to support combustion. Food may then be cooked over the grill 23, with uncooked food optionally supported on the table on one side thereof, and cooked food on the other.

When used as a hand truck, assuming it to be collapsed from the position shown in FIGURE 1, to the position shown in FIGURE 2 (assuming further that coals or ashes have been dumped from the pan C and the device has cooled), the shelf D is swung on its pivots 19 so as to raise it off the pan C. The pan C is raised by swinging it upwardly on its hinges 17 to disengage the hooks 9 from the bar 13. The legs A and B may then be folded together about pivots 12 with the end 16 supporting the pan C falling adjacent the bar 14. The free end of the pan may then be swung outwardly in the direction of the casters until the pan is upside down and one end wall thereof abuts against and rests on the bar 14. The free ends of the legs 11 will thereupon engage the underside of the lugs 10a on the legs 10 to support the legs 11 and help keep them from moving past the center of pivots 12. The table D may now be dropped into position over the folded frames A and B and thereby form a platform or base for the support of articles to be transported. In this position, the bottom 24 of the pan becomes the base or angular extension of the platform for transport purposes, the bottom 24 of the pan lying at the foot of the shelf 22 and substantially at right angles thereto. When used as a hand truck, the legs of the frames A and B form the side rails of the truck.

Figure 3:
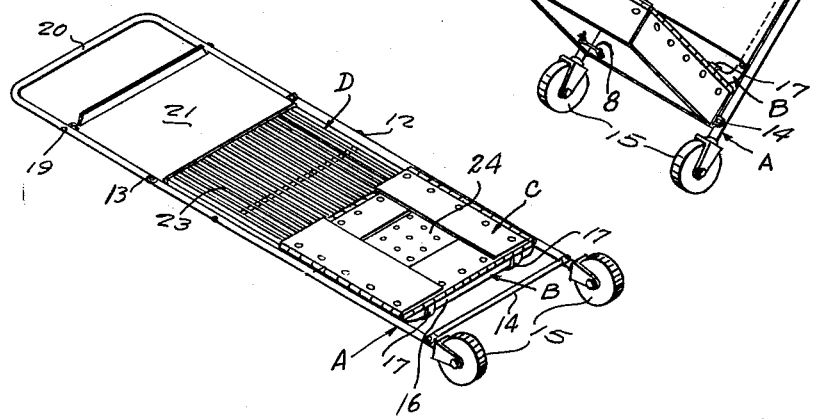
FIGURE 3 is a similar view of the combination folded in flat condition for storage or transport.

To further collapse the unit, for storage purposes, from the position shown in FIGURE 2, the pan C may be swung upwardly on its hinges and lowered over the table member D, as shown in FIGURE 3, the walls of the pan being collapsed as shown by first releasing the hooks 8 from their cooperating eyes. In this condition, the unit may conveniently be stored in the trunk or luggage rack of a car, in a closet, or elsewhere, where it will occupy a minimum of space.

It will be understood that the invention as shown and described is for illustrative purposes only and that changes of design and construction may be made without departing from the spirit of the invention as defined by the appended claims.

What is claimed is:

1. A combination hand truck and grill comprising a pair of pivotally connected frames having legs adapted to form side rails for a hand truck when collapsed and to form supports for a firepot when erected crosslegged fashion about their pivot, each of said frames having a handle member connecting said legs, one of said frames being longer than the other and carrying wheel members at one end, a firepot, having walls collapsible with respect to its bottom, pivotally secured to one of said frames and supported between them in fuel burning position when said frames are erected in crosslegged fashion, a table member including a grill portion pivotally secured to the other of said frames and supported over said firepot, said grill portion overlying said pot when said frames are erected, said firepot being swingable about its pivot and supported by the free end of the longer of said frames adjacent said wheel members when said legs are collapsed to form side rails for said truck, with the bottom of said firepot facing upwardly, and said table member being swingable to overlie said rails, forming with said bottom a platform for said truck, said frames, table member and firepot being further collapsible with respect to each other into a substantially flat condition, one upon the other, for storage purposes.

2. A hand truck and grill combination as set forth in claim 1, in which the longer of said frames has a connecting crossbar across its legs above and below the pivot, the upper bar forming a support for one end of said firepot when the combination is used as a grill, the lower bar forming a support for the firepot when the combination is used as a hand truck.

3. A hand truck and grill combination as set forth in claim 1, in which the longer of said frames has a connecting crossbar above the pivot point and said firepot has a pair of hooks at its free end, said hooks engaging said bar when the pot is erected into fuel burning position.

4. A hand truck and grill combination as set forth in claim 1, in which the longer of said frames has a connecting crossbar below the pivot point and adjacent said wheel members, a portion of said firepot resing on said crossbar when said combination is assembled for use as a hand truck.

5. A hand truck and grill combination as set forth in claim 1, in which the longer of said frames has a connecting crossbar, in which the firepot is hinged at one end to a portion of the shorter of said frames, the other end of said pot having a pair of hook members adapted to engage said crossbar when the combination is erected for use as a grill.

6. A hand truck and grill combination as set forth in claim 1, in which the shelf member is pivoted to the longer of said frames above their pivot point.

7. A hand truck and grill combination as set forth in claim 1, in which the table member comprises a pair of arms, each pivoted to a leg of the longer of said frames, said arms being connected by a grill member with a table portion on each end thereof, said grill member being adapted to overlie said firepot when the combination is erected for use as a grill.

8. A hand truck and grill combination as set forth in claim 1, in which the grill and firepot lie substantially parallel to each other, the grill overlying the pot when the combination is used as a grill, and in which said grill and firepot lie substantially at right angles to one another with the firepot at the base of the grill when the combination is assembled for use as a hand truck, said grill and firepot thereupon forming a platform for said truck.

9. A combination as set forth in claim 1 in which the firepot is secured to the shorter frame and the table member to the longer frame.

References Cited in the file of this patent
UNITED STATES PATENTS

| | | |
|---|---|---|
| 2,484,239 | Moon et al. | Oct. 11, 1949 |
| 2,740,395 | Goodwin | Apr. 3, 1956 |
| 2,780,474 | Farah et al. | Feb. 5, 1957 |
| 2,846,233 | Burg | Aug. 5, 1958 |
| 2,900,897 | Fisher | Aug. 25, 1959 |